Figure 1:
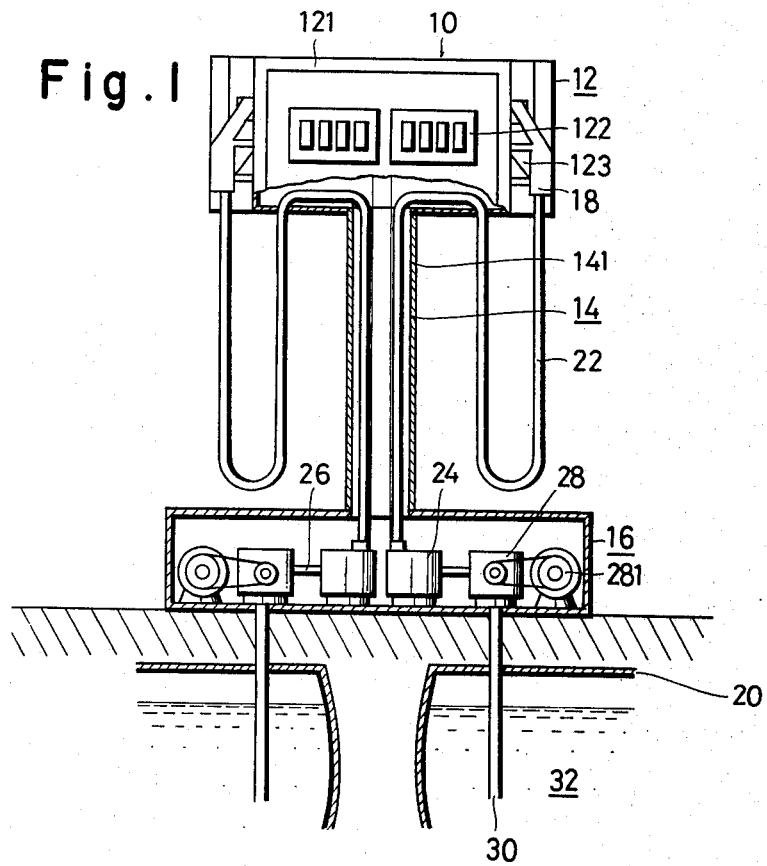

United States Patent [19]

Kuwabara et al.

[11] 3,995,769
[45] Dec. 7, 1976

[54] FUEL DISPENSING AND MEASURING DEVICE ARRANGED ON GROUND SURFACE

[75] Inventors: Etsuo Kuwabara, Funabashi; Masamitu Tadano, Yokohama; Mitsuo Horiuchi, Yokohama; Makoto Yoda, Yokohama; Saburo Ishida, Yokohama; Astushi Toba, Kawasaki; Susumu Ohhashi, Tokyo; Yoshiro Iwano, Kawasaki; Kazuo Sasaki, Kawasaki; Mitsuo Iwano, Kawasaki; Hiyoshi Tatsuno, Tokyo, all of Japan

[73] Assignees: Nippon Oil Company Ltd.; Tokyo Tatsuno Co., Ltd., both of Tokyo, Japan

[22] Filed: July 11, 1975

[21] Appl. No.: 595,246

Related U.S. Application Data

[63] Continuation of Ser. No. 460,157, April 11, 1974, abandoned.

[30] Foreign Application Priority Data

Apr. 13, 1973 Japan .............................. 48-41979

[52] U.S. Cl. ................................... 222/26; 222/28; 222/538
[51] Int. Cl.² ............................................ B67D 5/22
[58] Field of Search ............................ 222/25–28, 222/538, 16–20, 32–35, 481; D52/2 R, 2 A

[56] References Cited
UNITED STATES PATENTS

| 1,327,425 | 1/1920 | Eggleston | D52/2 A X |
|---|---|---|---|
| 1,359,668 | 11/1920 | Buchenau | D52/2 R X |
| 1,869,010 | 7/1932 | Jenkins | 222/26 |
| 2,160,459 | 5/1939 | Jauch et al. | 222/28 |
| 2,374,430 | 4/1945 | Hexter | D52/2 R X |
| 2,511,287 | 6/1950 | Moore | 222/28 |
| 2,577,115 | 12/1951 | Eichner | 222/28 X |
| 3,233,712 | 2/1966 | Witman | D52/2 A X |
| 3,570,644 | 3/1971 | Booth | D52/2 A X |
| 3,633,000 | 1/1972 | Bickford | 222/25 X |

*Primary Examiner*—Robert B. Reeves
*Assistant Examiner*—Charles A. Marmor
*Attorney, Agent, or Firm*—Frank J. Jordan

[57] ABSTRACT

A dispensing device for gasoline or the like liquid fuel which is mounted on a base structure or island as a part of the device, which occupies a relatively narrow space and may be of a hollow body so as to accomodate at least one of a flow meter, a fuel pump, and a motor for driving the pump. The device has at least three indication surfaces each directed in different direction around the device, so that an amount of the fuel dispensed and indicated on said surfaces can be read from any position around the device.

4 Claims, 4 Drawing Figures

FUEL DISPENSING AND MEASURING DEVICE ARRANGED ON GROUND SURFACE

This is a continuation of application Ser. No. 460,157, filed Apr. 11, 1974, now abandoned.

The present application relates to a gasoline or the like liquid fuel dispensing device which can more effectively supply the fuel to vehicles.

In usual liquid supplying stations, for instance, gas filling stations, a plurality of post- or column-like dispenser or pump housings are mounted on one or more islands which are provided on the ground surface in the station to guard the dispensers or pumps from a possible accident due to a contact or collison of a vehicle therewith and to guide vehicles entering in the station to service positions. In general, the island is constructed with concrete in the shape of a platform, so that two or more dispensing devices can be mounted upright thereon and an operator may ride thereon so as not to prevent any passageway for the vehicles. Such elongated island or islands not only occupy a relatively large area in a limited space of the station. Therefore, for the vehicle drivers, it is annoying and often difficult to enter the station site, approach the desired fuel dispensing device and leave the station, since the passageway is narrowed by said relatively large island or islands.

In conventional dispensing devices, further, there are provided only two indication surfaces or indicator windows at front and rear walls of a column housing thereof. Therefore, no one can read the amount of fuel being dispensed from the both side directions of the device, and the area where the indicator for showing the amount of dispensed fuel can be read is considerably restricted. Therefore, the operator or service man must conduct the vehicle to be located at a suitable position for supplying the requested fuel in the requested amount, while reading the amount of dispensed fuel. As a result, the operation efficiency for supplying the fuel is to be lowered. In order to solve such indicator reading problem, it has been proposed to mount the indicator on the dispenser or pump housing in rotatable manner, so that the operator can manually turn the indication surface to a desired direction. This dispensing device is useful, when the device is of a single type having only one dispensing nozzle for each post-like structure, but the almost of recent dispensing devices are constructed as a double type having two nozzles for each post-like structure, so that fuel can be simultaneously supplied to two vehicles stopped along the both sides of the island, with use of only one dispensing device. If only one rotatable indicator is mounted on such double type dispensing device, therefore, the simultaneous fuel supplying to two vehicles will, of course, be quite difficult or impossible.

A principal object of the present invention is, therefore, to provide a fuel dispensing device which overcomes and obviates the difficulties or disadvantages in the conventional devices, as referred to above.

A specific object of the present invention is to provide a fuel dispensing device which is mounted on each exclusive island or basic structure with a minimum required area or space.

Another object of the present invention is to provide a fuel dispensing device having an indicator of which visible direction is unchangeably fixed but in which dead angles for reading the indicator are substantially eliminated.

A further object of the present invention is to provide a fuel dispensing device which is mounted on each exclusive small island constituting a part of the device to accomodate, if necessary, at least one part of the device.

According to the present invention, there is provided a fuel dispensing device, comprising a body accomodating at least one indicating means which shows an amount of dispensed fuel and is arranged in such a way that the indicated fuel amount can be read from outside of the device, a base which occupies a relatively small area to form an island belonging exclusively to each of said body, a nozzle means hung to said body, and a means for transferring the fuel from a fuel reservoir to said nozzle means.

Figure 2:
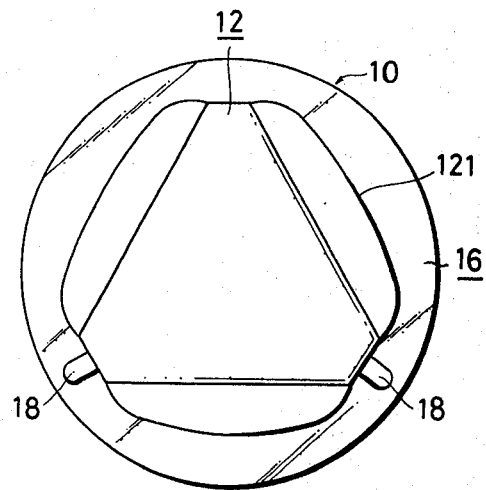
Figure 3:
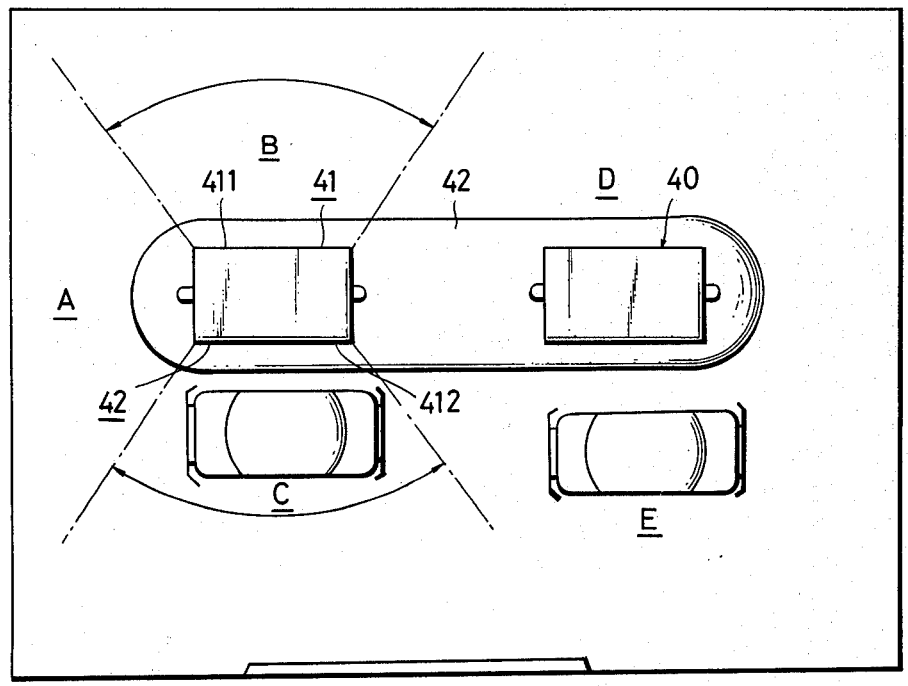
Figure 4:
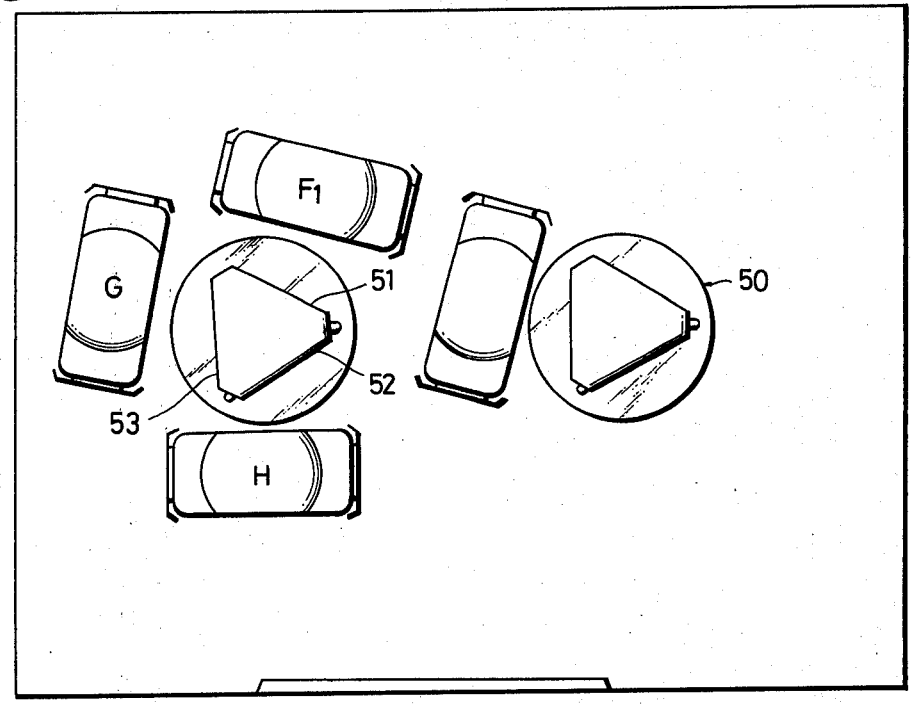

The invention will now be further explained in more detail with reference to an embodiment illustrated, as a mere example, in the drawings, in which FIG. 1 is a fragmental front of a fuel dispensing device according to the present invention;

FIG. 2 is a plan of the device shown in FIG. 1;

FIG. 3 is a schematic illustration of a conventional gas station, wherein two conventional double type fuel dispensing devices are mounted on an elongated island for showing how it hinders smooth and efficient fuel filling; and FIG. 4 is a schematic illustration of a gas station of same area or space with that shown in FIG. 3 and provided with two double type fuel dispensing devices according to the present invention.

In FIGS. 1 and 2, there is shown a fuel dispensing device according to the present invention. The device generally shown with reference numeral 10 comprises a head 12, a leg 14 and a base 16.

The head 12 has at least three indicator windows 121 made of a transparent material, for instance, a glass or transparent plastic material, at least three indicators 122 accomodated in the head 12 in such a way that a device operator can read the indicators from outside of the device 10 through the windows 121, and at least one nozzle hanging means 123. A nozzle means 18 hung to the hanger 123 is communicated to an underground fuel reservoir 20 through a flexible hose 22, a flow meter 24 transmitting its output to the indicators 122, a first fixed conduit 26, a fuel pump 28 driven by an electric motor 281 and a second fixed conduit 30 extended and dipped into a gasoline or the like liquid fuel 32. The illustrated dispensing device is a double type one and thus the indicator, nozzle and other concerned parts or elements are shown in double, but it is to be noted that the present invention can, of course, be applied to a single type one. In the illustrated embodiment, the flexible hose 22 is connected to the nozzle means 18 at one end and to the flow meter 24 at the other end, but, in practice, a part of the hose 22, namely the portion arranged in the dispensing device 10 may be substituted with a fixed conduit (not shown) one end of which is securely connected to the flow meter 24 and the other end is to one end of the flexible hose 22 through a liquid tight coupling (not shown). It is preferable to construct the head 12 substantially in a short triangular hollow prism- or cylinder-like form and to arrange each of the windows 121 at three side walls of the prism, as shown in FIG. 2, so that one of the indicators 122 showing the amount of fuel dispensed from the nozzle means 18 can be seen through the windows 121 from almost all positions around the head 12. Other polygonal hollow cylindrical shapes or configurations may be employed for the head 12, although those designs are not so preferable, since a manner for connecting a large number of indicators with the flow meter 24 is made complicate.

The leg 14 consists of a hollow cylindrical member 141 which may be of a relatively small cross section, since it is merely used for accomodating parts of the hose 22 and a means for transferring the output of the flow meter 24 to the indicators 122. However, if the space in the leg allows, the flow meter 24 and/or the fuel pump may be accomodated therein.

The base 16 having functions as an exclusive island may integrally be constructed to the leg 14 and/or a combined head and leg structure, and fixed to the ground surface in the gas station. In the illustrated embodiment, the flow meter 24, fuel pump 28, conduit 26 connecting the meter 24 and pump 28, and electric motor 281 are accomodated in the base 16, but, if the flow meter 24 shall be accomodated in the leg 14 as referred to and, as the pump 28, a submerged motor pump (not shown) shall be used and arranged in the fuel reservoir 20 at the free and of the second fixed conduit 30, the structure as housing shown in FIG. 1 may not be required for the base 16, although the illustrated housing-like structure is preferable, since such structure makes the installation of the dispensing device per se in and the removal of same from the gas station quite easy. The space to be occupied by each base 16 should be made as small as possible so as not to restrict the space in the station, but, in order to give such a function thereto as a protector as in usual island, the base 16 may occupy a space which is somewhat larger than the cross section of the head 12, as shown in FIG. 2. It is preferable to construct the base 16 as having a circular form in cross section, so that vehicle drivers who wish the service for fuel filling can simultaneously approach to portions around near one of the dispensing device.

Referring now to FIGS. 3 and 4, differences in operation efficiencies of two kinds of gas filling stations, one of which is installed with the conventional dispensing devices and the other of which is installed with the dispensing devices according to the present invention, will be explained.

In FIG. 3, there is illustrated the conventional station with two conventional double type fuel dispensing devices 40 each of which has only two indication surfaces 411 and 412 at a front and rear walls 41 and 42 of the device 40. With use of such conventional device, it is difficult for an operator of the device to supply fuel to a vehicle parked at a side portion of the device, for instance, at position A, since it will be impossible for him to read the amount of dispensed fuel during the servicing operation. Therefore, if a vehicle driver stops his vehicle at the position A, the operator must conduct the driver, prior to a fuel supplying operation, to turn the vehicle along an island 42 and to park the vehicle at either position B or C, so that the operator can supply the fuel to the vehicle, while reading the dispensing fuel amount at either of indication surface 411 or 412. In other words, with use of two double type conventional dispensing devices, the fuel supply can be carried out only for vehicles parked at four positions B, C, D and E.

Further, in the conventional station, when all of the dispensing devices are in operation, other vehicles must wait for a while at positions out of servicible range and then lead to the servicible range. Therefore, the fuel supplying operation efficiency for the conventional station is not so high.

FIG. 4 shows a station with two double type fuel dispensing devices 50 according to the present invention, said station having the same space or area with that shown in FIG. 3. With use of the dispensing device 50 according to the present invention, a device operator and vehicle driver at any position around the device 50 can read one of three indicators (see FIG. 1) each of which is accomodated in a concerned dispensing fuel amount indicator surface 51, 52 or 53 forming together a triangular prism- or cylinder-like structure. As shown in FIG. 4, at least three fuel dispensable positions F, G and H present for each dispensing device 50. For the dispensing device according to the present invention, there is no strict or definite limitation regarding servicible area, as having been shown in the conventional one mounted on the elongated island 42 (see dot and dash lines in FIG. 3) to dispense the vehicle conduct and thus the device operator can pay his full attention to the fuel supplying service.

Further, even if all of the dispensing devices 50 are in operation for fuel supplying to vehicles, another vehicle driver can approach to any one of the devices to park his vehicle at a servicible area or range. This means that the device operator can continuously supply the fuel to vehicles parked around the device one by one, even if the station is in rush time.

We claim:
1. A fuel dispensing device mounted on a ground surface comprising a fuel dispensing structure, said structure including a base, a head, and an upright member connecting said head to said base, said head being a hollow member of substantially prism-like form having a horizontal cross sectional area generally in the form of a triangle to thereby form three sides on said head, three indicating means in said head driven by a common source for indicating the amount of fuel dispensed with one indicating means being located on each one of said sides of said head whereby the amount of fuel dispensed can be read from at least one of said three indicating means from any position on a 360° circle about said structure, said base being a pedestal of a substantially circular horizontal cross section mounted directly on said ground surface as an exclusive island for the fuel dispensing device, said base occupying a relatively small amount of surface area such that vehicles may park at various angles around said base, said upright member comprising a tubular element secured to said base and to said head to thereby mount said head on said base, said upright member having a cross sectional area less than the cross sectional area of said base and less than the cross sectional area of said head, nozzle means mounted on said head for dispensing fuel therethrough, and transfer means in said structure for transferring fuel to said nozzle means.

2. A fuel dispensing device according to claim 1 wherein said nozzle means comprises nozzle elements having outlets through which fuel is discharged, said three sides of said head being constructed and arranged such that each two sides are interconnected by interconnecting means located generally at the apex of the triangle defined by said three sides, said interconnecting means supporting said nozzle elements generally at the apexes of said triangle.

3. A fuel dispensing device according to claim 1 wherein said base is a hollow member to accommodate at least parts of said fuel transfer means.

4. A fuel dispensing device according to claim 1 wherein said base has a horizontal cross sectional area larger than the horizontal cross sectional area of said head.

* * * * *